US012570938B2

(12) United States Patent
Hall et al.

(10) Patent No.: US 12,570,938 B2
(45) Date of Patent: Mar. 10, 2026

(54) FLAVOR INFUSED ALCOHOLIC BEVERAGE AND METHOD OF MAKING THE SAME

(71) Applicant: BRAIN BREW VENTURES 3.0, INC., Newtown, OH (US)

(72) Inventors: Douglas B. Hall, Newtown, OH (US); Joseph M. Girgash, Newtown, OH (US); Bruce Forsee, Newtown, OH (US); James J. Beaupre, Glenburn, ME (US)

(73) Assignee: BRAIN BREW VENTURES 3.0, INC., Newtown, OH (US)

( * ) Notice: Subject to any disclaimer, the term of this patent is extended or adjusted under 35 U.S.C. 154(b) by 447 days.

(21) Appl. No.: 15/780,008

(22) PCT Filed: Nov. 30, 2016

(86) PCT No.: PCT/US2016/064204
§ 371 (c)(1),
(2) Date: May 30, 2018

(87) PCT Pub. No.: WO2017/095915
PCT Pub. Date: Jun. 8, 2017

(65) Prior Publication Data
US 2018/0371387 A1        Dec. 27, 2018

Related U.S. Application Data

(60) Provisional application No. 62/261,287, filed on Nov. 30, 2015.

(51) Int. Cl.
*C12G 3/07*        (2006.01)
*C12H 1/16*        (2006.01)
*C12H 1/22*        (2006.01)

(52) U.S. Cl.
CPC ................. *C12G 3/07* (2019.02); *C12H 1/16* (2013.01); *C12H 1/22* (2013.01)

(58) Field of Classification Search
CPC .................................... C12G 3/07; C12H 1/22
(Continued)

(56) References Cited

U.S. PATENT DOCUMENTS

| 889,828 A | 6/1908 | Trescott |
| 1,017,647 A | 2/1912 | Burton |

(Continued)

FOREIGN PATENT DOCUMENTS

| CA | 2740069 C | 2/2017 |
| DE | 2618226 A1 | 11/1977 |

(Continued)

OTHER PUBLICATIONS

PCT Notification of Transmittal of the International Search Report and the Written Opinion of the International Searching Authority, or the Declaration. Dated Jan. 30, 2017 (Jan. 30, 2017).

(Continued)

*Primary Examiner* — Vera Stulii
(74) *Attorney, Agent, or Firm* — FBT GIBBONS LLP

(57)        ABSTRACT

The present invention is an alcoholic beverage having the sensory characteristics of a flavored distilled spirit. The method for making the alcoholic beverage includes suspending botanicals above a distilled spirit in a closed container and applying pressure to create interaction between the botanicals and distilled spirit.

27 Claims, 1 Drawing Sheet

(58) Field of Classification Search
USPC ......... 426/592, 494, 425, 489, 330.3, 330.4,
426/429, 431, 11, 15
See application file for complete search history.

(56) References Cited

U.S. PATENT DOCUMENTS

| | | | |
|---|---|---|---|
| 1,964,372 | A | 6/1934 | Tygart |
| 2,027,099 | A | 1/1936 | Hochwalt et al. |
| 2,114,331 | A | 4/1938 | Brown |
| 2,145,243 | A | 1/1939 | Bagby |
| 2,807,547 | A | 9/1957 | Nickol |
| 3,943,841 | A | 3/1976 | Huang |
| 4,173,656 | A | 11/1979 | Duggins |
| 4,932,272 | A | 6/1990 | Hogg |
| 4,956,194 | A | 9/1990 | Gos |
| 5,972,401 | A | 10/1999 | Kowalski |
| 6,203,836 | B1 | 3/2001 | Gross, II et al. |
| 6,681,686 | B1 | 1/2004 | Chiu |
| 7,171,825 | B2 | 2/2007 | Matsuoka et al. |
| 7,866,254 | B1 | 1/2011 | Karasch et al. |
| 8,889,206 | B2 | 11/2014 | Lix |
| 2002/0168446 | A1 | 11/2002 | Zimlich, III et al. |
| 2009/0136638 | A1 | 5/2009 | Fujie et al. |
| 2010/0092636 | A1 | 4/2010 | Watson et al. |
| 2011/0070331 | A1 | 3/2011 | Watson |
| 2012/0088018 | A1 | 4/2012 | Lix |
| 2012/0132082 | A1 | 5/2012 | Baird et al. |
| 2012/0164300 | A1 | 6/2012 | Niazi |
| 2013/0149423 | A1 | 6/2013 | Lix |
| 2015/0017297 | A1 | 1/2015 | Vastardis et al. |
| 2015/0197716 | A1 | 7/2015 | Davis |

FOREIGN PATENT DOCUMENTS

| | | | | |
|---|---|---|---|---|
| DE | 279497 | A1 | 6/1990 | |
| EP | 1438897 | A1 | 7/2004 | |
| JP | 13-012055 | Y | 8/1938 | |
| JP | 3094680 | U | 7/2003 | |
| JP | 2011160784 | A | 8/2011 | |
| JP | 2013081443 | A | 5/2013 | |
| JP | 2015202105 | A | 11/2015 | |
| RU | 2084510 | C1 | 7/1997 | |
| WO | WO-2015013704 | A2 * | 1/2015 | ............. C12G 3/065 |

OTHER PUBLICATIONS

Declaration of Daniel Martin Watson dated Apr. 22, 2015 in the prosecution history of U.S. Appl. No. 12/957,108 (Application Publication No. 20110070331).
Williams, Rhett, "Science of Barrel Aging," Shakestir, Feb. 18, 2013, retrieved from https://www.shakestir.com/features/id/551/ science-of-barrel-aging on Feb. 24, 2022 (3 pages).

* cited by examiner

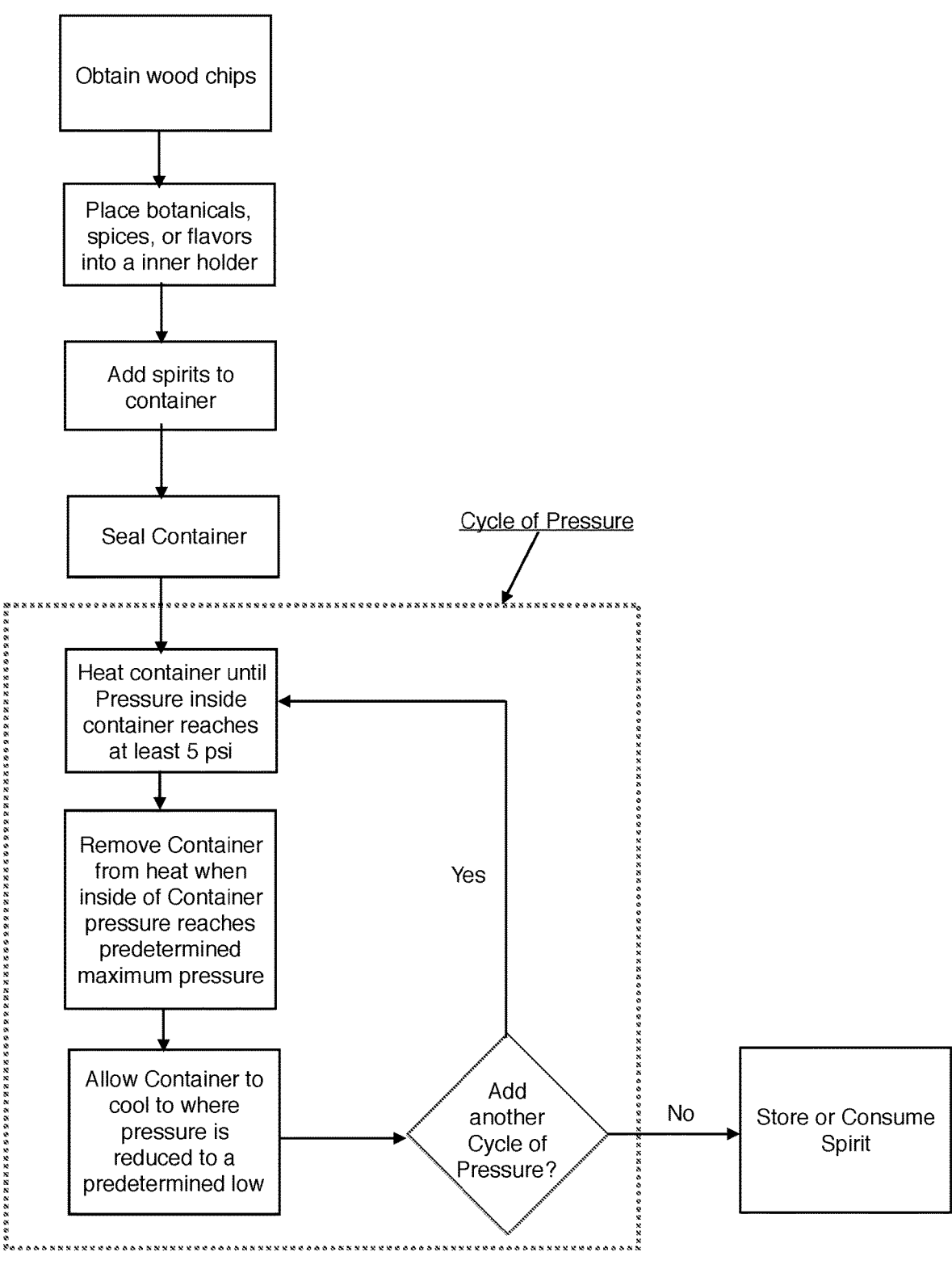

FLAVOR INFUSED ALCOHOLIC BEVERAGE AND METHOD OF MAKING THE SAME

CROSS-REFERENCE TO RELATED APPLICATION

The present application claims priority to provisional U.S. Patent Application No. 62/261,287 as filed Nov. 30, 2015.

STATEMENT REGARDING FEDERALLY SPONSORED RESEARCH

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to alcoholic beverages, and more specifically relates to a method, and resulting spirits, for imparting more intense flavors and appealing sensory characteristics.

2. Description of the Related Art

In traditional whiskey-making methods, a high proof distillate is aged in an oak barrel and the wood adds color, smoothness, flavor, and other characteristics to the whiskey. But wood barrels are becoming increasingly expensive and their porosity (while important to the aging process) can result in significant evaporation loss.

In addition to the cost issue related to wood expense is the actual aging process where a particular spirit may be aged anywhere from 3 to 50 or more years. Generally speaking, the longer aged spirits are able to interact more with the wood of the barrels and develop a more refined flavor, taste, color, finish, and smoothness as desired by consumers.

Compounding this issue is the fact that aged whisky stocks are declining and those in the "Baby Boomer" generation are declining, and this is the age group that consumed the traditional scotch whisky and other aged distilled spirits.

Young spirits tend to be harsh and rough on one's palate. It is through interaction with wood, usually in the form of the barrel holding the spirit, that the spirit develops sensory characteristics that consumers generally prefer as measured by purchase preference and perception of "smoothness" and "easy to drink."

It is known in the industry that flavors can be introduced to a distilled spirit through different processes. Very often the flavors added are artificial or "laboratory created" to try to replicate otherwise natural or familiar flavors. However, younger generations of spirit drinkers are looking for more natural flavors that may be more intense and do not mask the distilled spirits' own flavors, but instead complement and support them.

There have been attempts made to create a younger spirit that has the sensory characteristics of a traditionally aged spirit. Of note is Russian Patent No. 2084510 for "Method Maturation Ethyl Alcohol." The Russian patent describes a process for "accelerated maturation—aging cognac" that includes loading 10 mm thick oak rivets into tanks with alcohol and then increasing the internal pressure of the tank to 2 to 5 ATA for a duration of 24 to 48 hours followed by 24 to 48 hours of no pressure. Although process in the Russian patent is faster than traditional methods, more rapid cycle times to obtain the same results would be preferred.

Other patents such as U.S. Pat. No. 8,889,206 to Lix provide general information about a process for making whiskey in a pressurized container; however, does not provide many details on the process aside from teaching to profile the staves placed in the container with the alcohol.

US Patent Application Publication No. 2010/092636 to Watson describes a method for "accelerating aging of ethanol-based beverages" that very generally describes such method using pressures of at least 200 psi to 5000 psi, and pressures below that are "not sufficient to produce" the desired reactions. However, such pressures are highly expensive to realize in production and not achievable in the majority of production facilities.

Thus, what is desired is the sensory characteristics that are developed through multiple years of aging with a wood barrel and natural flavors; however, but at a total process time of less than a day and at lower applied pressures.

SUMMARY

The present invention is a method for imparting the sensory characteristics of a matured distilled spirit to a younger distilled spirit. The method is comprised of the steps of: introducing a distilled spirit having an alcohol content of about 40% to about 57% to a container; suspending botanicals in an inner holder above the distilled spirit; sealing the container; and increasing an internal pressure of the container to about 5 psi to about 150 psi such that when a maximum predetermined pressure is achieved within the container, the pressure is then released and the internal pressure is reduced back to a predetermined lower pressure. And the increasing and decreasing the internal pressure of the container can be repeated as needed.

DRAWINGS

FIG. 1 is a flowchart showing an exemplary embodiment for a method for making a vapor infused spirit.

DESCRIPTION

Referring to the FIG. 1, the present invention includes a method for imparting the sensory characteristics of a flavored spirit using natural essences to a distilled spirit in a significantly shorter time period.

It should be noted that the features of the present method are directed to a particular consumer market. In particular, the features of the present method provide sensory characteristics in flavor, texture, color, smoothness, and ease of drinking in a distilled spirit that have been found to appeal to the generation currently identified as "millennials," which generally includes individuals born between 1980 and 2000.

When this method was researched consumers aged 21 to 39 were researched in alignment with alcohol consumption laws. These sensory characteristics of the distilled spirit according to the present method may not be as palatable, as a whole, to traditional whiskey, bourbon, or other distilled spirit drinkers. However, the millennials are growing to be the most powerful consumers, and as such, the examples and surveys conducted with finished products according to the present method are primarily focused on millennials. And as is industry practice across fields, one needs to attract a younger demographic, that can legally use its products, as they are being introduced to a new category of goods and services.

Referring to the drawing, a method for vapor infusing a spirit is shown. In this method, an inner holder, able to be suspended above a spirit in the container used.

Within the inner holder, botanicals, spices, or other flavors are placed. The botanicals, spices, or other flavors are known to those skilled in the art of spirit making.

The inner holder is suspended above the liquid spirit that is put within the container. Thus, none of the spirit should come in contact with the inner holder, nor its contents, directly. And the container is a closed system.

The inner holder is preferably perforated or has multiple holes to keep the contents of the inner holder from falling from the inner holder, but allowing vapor from the liquid contents to pass through.

The term spirit, used throughout, refers to a distilled beverage that has at least 5% alcohol by volume (ABV).

The spirit may be any of whiskey, scotch whisky, bourbon, vodka, gin, rum, brandy, eau de vie (fruit brandy or schnapps), tequila, baijiu, soju, aguardiente, pálinka, cachaça, singani, borovička, slivovitz, moonshine, raw or young spirit, or a combination thereof. It has been found that the percent alcohol of the spirit for the present invention is preferred to be about 40% to about 57%.

In an exemplary embodiment, wood chips are obtained and mixed with the spirits in the container. However, this is exemplary.

When used, the wood chips may be from any source of wood. Preferably, the wood chips are from an oak cask. In an exemplary embodiment, the wood chips have primary side (length×width) dimensions of about 1 to about 2 inches in length, about ½ to about 1 inch in width, and a thickness of about ⅛ to about ¼ inch. Although the wood chips are discussed as being substantially rectangular in shape, it is understood by those of ordinary skill in the art that the wood chips will vary in shape and size.

The wood chips, when used, are introduced to a container, and a spirit is mixed with the wood chips in the container.

In addition to or as an alternative to the wood chips, nut shells can be used to mix with the spirits in the present method.

The container holding the suspended botanicals and spirits is sealed and heated until the measured pressure of the inside of the sealed container increased to a minimum of 5 psi and not to be greater than about 150 psi.

The container is then removed from the heat and allowed to cool to substantially room temperature and the pressure within the inside of the container is reduced to a predetermined low pressure.

Heating the container with the mixture of wood chips and spirit to about 5 psi to 150 psi atmosphere, followed by allowing the container temperature to cool and reach standard pressure is considered as a single cycle of aging.

As the maximum amount of pressure is reached within the container, the pressure is preferably then lowered to reach standard pressure. In other words, the contents of the container are not held at the maximum pressure for a long period, less than about 24 hours based on sensory characteristics desired, of time. However, it is preferred that once the maximum pressure is reached, it is reduced. The actual time for each cycle will vary based on the amount of spirit, botanicals, wood, maximum pressure, the desired taste character, production efficiency and the like.

The mixture of spirit and botanicals and optional wood chips go through 1 or more cycles, the actual number of cycles varied based on desired sensory characteristics of the resulting flavored spirit. The cycles are required to have the desired sensory characteristics of the resulting flavored distilled spirit for a millennial consumer.

A more preferred number of cycles is 2-5 per resulting flavored distilled spirit.

After the desired number of cycles is conducted, the resulting flavored spirit is filtered to separate it from any particulate matter. The resulting flavored spirit may then be stored or consumed.

Experimentation has shown that the increased pressure within the container forces the vapor spirit molecules to pass through the inner holder and its contents, and taking with the spirit some of the essence and flavors of the contents of the inner holder. This is in contrast to steeping the contents of the inner holder with the spirit, or distilling the spirit and having the distillate drip or pass through botanicals in what is known as a "Carter-Head still," which is also an open system. The current system is a batch, closed system.

When wood chips are used, experimentation has shown that the increased pressure within the container forces the spirit molecules into the wood chips, thus ensuring the spirit interact with more than just the surface of the wood chips. As the pressure is decreased, the spirit moves back out of the wood chips, causing an interaction where some of the inner parts of the wood may be introduced to the spirit and some parts may interact with the spirit to create new compounds.

It is most preferred that the pressure be between about 5 psi and about 150 psi. It is noted that this lower pressure runs contrary to the prior art and what those of ordinary skill in the art argue the pressure should be. However, it has been found that this lower pressure helps the resulting flavored alcohol have the most desired sensory characteristics to the distilled spirits for the consumers of interest.

It has been surprisingly found that charring the wood chips on at least one of the two primary sides, or the whole chip, increases process according to the present invention. This means that charring the wood chips on at least one side before mixing with the spirit and undergoing one or more cycles imparts a greater amount of color and flavor from the wood chips to the spirit in fewer cycles. Or said another way, the charring of the wood changes the different sensory characteristics imparted to the spirit.

In another embodiment, the wood chips are toasted in addition or as an alternative to charring the wood chips. Like with charring, toasting the wood changes the different sensory characteristics imparted to the spirit.

Alternatively, or in conjunction to charring the wood chips, the wood chips may be smoked prior to introduction to container and being mixed with the spirits. As is classically done, the entire chips can also be charred or toasted.

As known in the industry, particular wood barrels impart different sensory characteristics to the held spirit. Examples of such finishes include cognac, port, rum, sherry, bourbon, scotch, madeira, wines, etc. For example, scotch whiskey is finished in sherry oak casks. So, in yet another variation of the present invention, the wood chips are prepped by the procedure known in the industry as finishing.

In an exemplary embodiment, the surface area of the wood chips has an open grain of greater than an average of about 20% as opposed to traditional wood chips that have surface area of open grain averaging about 9%. "Open grain" is being used as commonly understood to mean that the pores or cut ends of the wood fibers are visible and/or exposed. In preferred embodiment, the open grain represents about 50% or more on average of the surface area of the wood chips. And in a most preferred embodiment, the open grain represents about 73% or more on average of the surface area of the wood chips.

It has been found that wood chips having this greater open grain surface area (and treated or finished as known in the art) can then be introduced to the distilled spirit in the container according to the present process. Millennial customers in a paired comparison test preferred the resulting flavored spirit made using the 20% or greater open grain surface area wood chips versus a flavored spirit made using wood chips having the traditional 9% open grain surface area wood chips. As part of that survey, it was found that the spirit made with the 20% or greater open grain surface area wood chips was deemed to "taste more like bourbon" and had a significantly greater purchase intent on the part of the potential consumers.

The actual number of cycles for the spirit to undergo will vary based in part on the amount and type of botanicals used, the maximum pressure of the container, the type of spirit used, the ratio of wood chips to spirits when using wood, the wood chips charred condition when using wood, the type of wood chips when used, and the like.

Embodiment 1

A distilled spirit, a rum, according to the present invention was prepared with the following dimensions:

| Types of Botanicals | Orange peel, *Vanilla* bean, and Cinnamon stick |
|---|---|
| Amount of Botanicals | 16.5 g |
| Amount of wood chips | 0 g |
| Amount of spirit | 750 mL |
| Percent of alcohol in spirit | 42% |
| Maximum pressure per cycle | 15 psi |
| Number of cycles | 4 |

The resulting flavored distilled spirit was also 42% alcohol. It was tested in a paired comparison blind test against one of the top selling super-premium rums based on US and International Sales. It was tested with a random sample of 21 to 39 year old Americans. For purchase intent, the present invention in Embodiment 1 was preferred versus the super-premium rum 69% to 31%. In the same pairing, Embodiment 1 won in a consumer perception of "smoothness" by 77% to 23%, and in consumer perception of "easier to drink" by 78% to 22%.

Embodiment 2

A distilled spirit, a whisky, according to the present invention was prepared with the following dimensions:

| Types of Botanicals | Orange peel, *Vanilla* bean, and Cinnamon stick |
|---|---|
| Amount of Botanicals | 16.5 g |
| Amount of wood chips | 0 g |
| Amount of spirit | 750 mL |
| Percent of alcohol in spirit | 42% |
| Maximum pressure per cycle | 150 psi |
| Number of cycles | 4 |

6

The resulting flavored distilled spirit was also 42% alcohol. It was tested in a paired comparison blind test against Embodiment 1, with a random sampling of 21 to 39 year old Americans. For purchase intention, Embodiment 2 lost to Embodiment 1 by 35% to 65%. In the same pairing, Embodiment 2 lost in consumers perception of "smoothness" and perception of "easy to drink." In a consumer perception of "tastes like it has the most natural tasting flavor," Embodiment 2 lost to Embodiment 1 by 35% to 65%.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for imparting the sensory characteristics of a more matured distilled spirit to a distilled spirit, the steps being comprised of:
   introducing a distilled spirit having an alcohol content of about 40% to about 57% to a container, wherein the distilled spirit is selected from the group consisting of vodka, gin, rum, brandy, eau de vie, tequila, baijiu, soju, aguardiente, and cachaca;
   suspending botanicals in an inner holder above the distilled spirit;
   sealing the container such that the container is a closed system with a fixed mass of gas;
   heating the container until an internal pressure of the container reaches a predetermined maximum pressure of 15 psi;
   cooling the container until the internal pressure reaches a predetermined lower pressure; and
   cycling the heating step and the cooling step from 2 to 10 times, wherein the container is sealed for a duration of the step of cycling the heating step and the cooling step, and wherein the method has a total process time of less than a day.

2. The method according to claim 1, further comprising cycling the heating step and the cooling step for a total of 10 times.

3. The method according to claim 1, further comprising cycling the heating step and the cooling step for a total of 2 to 6 times.

4. The method according to claim 1, further comprising: adding wood chips at a ratio of about 30 to about 60 grams per 750 mL of the raw distilled spirit to the container prior to sealing the container, wherein all of the wood chips are mixed with the distilled spirit.

5. The method according to claim 4, wherein the wood chips are charred or toasted on at least one side and finished prior to introduction to the container.

6. The method according to claim 4, wherein the wood chips are smoked prior to introduction to the container.

7. The method according to claim 4, wherein the wood chips are finished prior to introduction to the container.

8. The method according to claim 4, wherein the wood chips have a primary side (length×width) dimension of about 1 to about 2 inches in length, about ½ to about 1 inch in width, and a thickness of about ⅛ to about ¼ inch.

9. The method according to claim 4, wherein the wood chips have an open grain surface area of about 20% or more.

10. The method according to claim 1, wherein the alcohol content of the distilled spirit is about 40% to about 45%.

11. The method according to claim 1, wherein the inner holder has multiple holes or is a mesh to allow vapor from the distilled spirit to pass through.

12. A method for imparting the sensory characteristics of a more matured distilled spirit to a distilled spirit, the steps being comprised of:

introducing a distilled spirit having an alcohol content of about 40% to about 45% to a container;

suspending botanicals in an inner holder above the distilled spirit;

sealing the container such that the container is a closed system with a fixed mass of gas;

heating the container until an internal pressure of the container reaches a predetermined maximum pressure, the predetermined maximum pressure being at least 15 psi;

cooling the container until the internal pressure reaches a predetermined lower pressure; and cycling the heating step and the cooling step from 2 to 10 times, wherein the container is sealed for a duration of the step of cycling the heating step and the cooling step, wherein wood chips are not introduced to the container in the method and wherein the method has a total process time of less than a day.

13. A method for imparting the sensory characteristics of a more matured distilled spirit to a distilled spirit, the steps being comprised of:

introducing a distilled spirit having an alcohol content of about 40% to about 45% to a container, wherein the distilled spirit is not whiskey, scotch whiskey, or bourbon;

suspending botanicals in the container above the distilled spirit;

sealing the container such that the container is a closed system with a fixed mass of gas;

heating the container until an internal pressure of the container reaches a predetermined maximum pressure, the predetermined maximum pressure being in a range of about 10 psi to less than 20 psi;

cooling the container until the internal pressure is reduced back to a predetermined lower pressure; and cycling the heating step and the cooling step from 2 to 10 times, wherein the container is sealed for a duration of the step of cycling the heating step and the cooling step, and wherein the method has a total process time of less than a day.

14. A finished distilled spirit having the sensory characteristics of a more matured distilled spirit produced by the steps comprising:

introducing a distilled spirit having an alcohol content of about 40% to about 57% to a container, wherein the distilled spirit is gin;

suspending botanicals in an inner holder above the distilled spirit;

sealing the container such that the container is a closed system with a fixed mass of gas;

heating the container until an internal pressure of the container reaches a predetermined maximum pressure, the predetermined maximum pressure being in a range of about 10 psi to less than 20 psi;

cooling the container until the internal pressure reaches a predetermined lower pressure; and cycling the heating step and the cooling step from 2 to 10 times over a time period of less than a day, wherein the container is sealed for a duration of the step of cycling the heating step and the cooling step.

15. The finished distilled spirit according to claim 14, further comprising cycling the heating step and the cooling step for a total of 10 times.

16. The finished distilled spirit according to claim 14, further comprising cycling the heating step and the cooling step for a total of 2 to 6 times.

17. The finished distilled spirit according to claim 14, further comprising the step of:

adding wood chips at a ratio of about 30 to about 60 grams per 750 ml of the raw distilled spirit to the container prior to sealing the container, wherein all of the wood chips are mixed with the distilled spirit.

18. The finished distilled spirit according to claim 17, wherein the wood chips are charred or toasted on at least one side prior and finished prior to introduction to the container.

19. The finished distilled spirit according to claim 17, wherein the wood chips are smoked prior to introduction to the container.

20. The finished distilled spirit according to claim 17, wherein the wood chips are finished prior to introduction to the container.

21. The finished distilled spirit according to claim 17, wherein the wood chips have a primary side (length×width) dimension of about 1 to about 2 inches in length, about ½ to about 1 inch in width, and a thickness of about ⅛ to about ¼ inch.

22. The finished distilled spirit according to claim 17, wherein the wood chips have an open grain surface area of about 20% or more.

23. The finished distilled spirit according to claim 14, wherein the alcohol content of the distilled spirit is about 40% to about 45%.

24. The finished distilled spirit according to claim 14, wherein the inner holder has multiple holes or is a mesh to allow vapor from the distilled spirit to pass through.

25. A finished distilled spirit having the sensory characteristics of a more matured distilled spirit produced by the steps comprising:

introducing a distilled spirit having an alcohol content of about 40% to about 45% to a container, wherein the distilled spirit is not whiskey, scotch whiskey, or bourbon;

suspending botanicals in the container above the distilled spirit;

sealing the container such that the container is a closed system with a fixed mass of gas;

heating the container until an internal pressure of the container reaches a predetermined maximum pressure, the predetermined maximum pressure being in a range of about 10 psi to less than 20 psi;

cooling the container until the internal pressure reaches a predetermined lower pressure; and cycling the heating step and the cooling step from 2 to 10 times over a time period of less than a day, wherein the container is sealed for a duration of the step of cycling the heating step and the cooling step, and wherein wood chips are not introduced to the container in the method.

26. The method of claim 1, wherein zero grams of wood chips are used in the method.

27. The method of claim 13, wherein zero grams of wood chips are used in the method.

\* \* \* \* \*